US012008923B2

(12) United States Patent
Newcomb

(10) Patent No.: US 12,008,923 B2
(45) Date of Patent: Jun. 11, 2024

(54) ILLUMINATED ADDRESS SIGN ASSEMBLY WITH INTEGRATED SECURITY FEATURES

(71) Applicant: Royce Newcomb, Fresno, CA (US)

(72) Inventor: Royce Newcomb, Fresno, CA (US)

( * ) Notice: Subject to any disclaimer, the term of this patent is extended or adjusted under 35 U.S.C. 154(b) by 504 days.

(21) Appl. No.: 17/126,527

(22) Filed: Dec. 18, 2020

(65) Prior Publication Data

US 2021/0118339 A1 Apr. 22, 2021

Related U.S. Application Data

(63) Continuation of application No. 16/837,659, filed on Apr. 1, 2020, now Pat. No. 10,878,730.

(60) Provisional application No. 62/923,543, filed on Oct. 19, 2019.

(51) Int. Cl.

| | |
|---|---|
| ***G09F 13/00*** | (2006.01) |
| ***G08B 5/38*** | (2006.01) |
| ***G09F 7/18*** | (2006.01) |
| ***G09F 13/04*** | (2006.01) |

(Continued)

(52) U.S. Cl.

CPC ............ *G09F 13/005* (2013.01); *G08B 5/38* (2013.01); *G09F 7/18* (2013.01); *G09F 13/0413* (2013.01); *G09F 13/0445* (2021.05); *G09F 13/08* (2013.01); *G09F 27/004* (2013.01); *G09F 27/007* (2013.01); *G09F 2007/1852* (2013.01); *G09F 13/0422* (2021.05); *G09F 13/0481* (2021.05); *G09F 13/049* (2021.05)

(58) Field of Classification Search

CPC ...... G09F 13/005; G09F 7/18; G09F 13/0413; G09F 13/08; G09F 27/004; G09F 27/007; G09F 2007/1852; G09F 2013/0481

See application file for complete search history.

(56) References Cited

U.S. PATENT DOCUMENTS 3,360,791 A * 12/1967 Lazar ...................... G08B 5/22 340/332
4,380,880 A * 4/1983 Gandy ............... G09F 13/0413 40/564

(Continued)

FOREIGN PATENT DOCUMENTS

WO 2016093542 A1 6/2016
WO 2021201889 A1 10/2021

OTHER PUBLICATIONS

International Search Report and Written Opinion dated Aug. 11, 2020 for PCT/US20/030891 from the U.S. Receiving Office, pp. 1-15, United States.

(Continued)

*Primary Examiner* — Gary C Hoge
(74) *Attorney, Agent, or Firm* — Barry Choobin; Patent 360

(57) ABSTRACT

One embodiment provides an illuminated address sign that includes a frame with an open front side and an open rear side. The open front side interchangeably receives a first plaque, and the open rear side interchangeably receives a second plaque. Multiple first attachment points are configured on the open rear side of the frame. The multiple first attachment points connect with a bracket for mounting the illuminated address sign to a first surface. A control unit is connected to the frame and a light source. A light sensor is connected to the frame and the control unit.

25 Claims, 17 Drawing Sheets

(51) Int. Cl.
*G09F 13/08* (2006.01)
*G09F 27/00* (2006.01)

(56) References Cited

U.S. PATENT DOCUMENTS

| | | | | | |
|---|---|---|---|---|---|
| 4,587,753 | A * | 5/1986 | Harper | G09F 13/06 340/331 |
| 4,686,505 | A * | 8/1987 | Vanderburg | G08B 7/064 340/331 |
| 4,931,780 | A * | 6/1990 | LaMont | G08B 7/064 340/331 |
| 4,993,058 | A * | 2/1991 | McMinn | H04M 11/04 379/396 |
| 5,435,087 | A * | 7/1995 | Karkar | G09F 13/04 40/575 |
| 5,521,578 | A * | 5/1996 | DelValle | G08B 5/36 340/331 |
| 5,573,328 | A * | 11/1996 | Hwang | H05B 47/10 362/183 |
| 5,615,501 | A * | 4/1997 | Rice | G09F 21/04 40/574 |
| 5,911,524 | A * | 6/1999 | Wilton | G09F 13/04 362/802 |
| 6,060,838 | A * | 5/2000 | Cantoni | H05B 47/11 315/159 |
| 6,367,180 | B2 * | 4/2002 | Weiss | G09F 13/0409 40/564 |
| 6,401,373 | B1 * | 6/2002 | Sexton | G09F 13/06 40/621 |
| 6,901,688 | B1 * | 6/2005 | King | G09F 13/04 40/564 |
| 7,259,670 | B2 | 8/2007 | Cunningham et al. | |
| 7,540,628 | B2 | 6/2009 | Awai et al. | |
| 7,578,085 | B1 * | 8/2009 | Chao | G09F 13/04 362/183 |
| 9,691,307 | B2 | 6/2017 | Braunstein | |
| 2003/0121191 | A1 * | 7/2003 | DeJarnette | G09F 13/04 40/576 |
| 2005/0055856 | A1 | 3/2005 | Johnston et al. | |
| 2006/0150453 | A1 * | 7/2006 | Martin | G09F 13/22 40/544 |
| 2006/0265921 | A1 * | 11/2006 | Korall | G09F 27/007 40/579 |
| 2008/0155871 | A1 * | 7/2008 | Parker | G09F 13/06 40/576 |
| 2011/0094135 | A1 * | 4/2011 | Frey | G09F 13/04 40/605 |
| 2015/0269876 | A1 * | 9/2015 | Grosser, III | H01L 31/042 40/219 |
| 2015/0294603 | A1 * | 10/2015 | Braunstein | G09F 13/005 315/86 |
| 2019/0057674 | A1 | 2/2019 | Hoppe et al. | |
| 2019/0206289 | A1 * | 7/2019 | St. John | B60Q 1/503 |
| 2022/0028305 | A1 * | 1/2022 | Gardner | G09F 13/0413 |

OTHER PUBLICATIONS

U.S. Notice of Allowance for U.S. Appl. No. 16/837,659 mailed Aug. 12, 2020.

* cited by examiner

ILLUMINATED ADDRESS SIGN ASSEMBLY WITH INTEGRATED SECURITY FEATURES

CROSS-REFERENCE TO RELATED APPLICATIONS

This application is a continuation patent application of U.S. Ser. No. 16/837,659 filed on Apr. 1, 2020, which claims priority to the U.S. provisional patent application Ser. No. 62/923,543 filed on Oct. 19, 2019, entitled "eLiT," which are both incorporated herein by reference in their entirety.

FIELD OF INVENTION

The present invention relates to an illuminated address sign assembly for a building, and in more particular, to an illuminated address sign assembly with emergency signaling and other integrated security features for home, office, and similar buildings.

BACKGROUND

Address signs for use on the exterior of houses, apartments, offices, and other buildings are well known. The address signs help those who are looking for the building through its address provided as an address sign in exterior areas of the building. The address signs generally include a frame to which an address plaque is mounted. The address plaque has on it imprinted alphanumeric characters representing the address of the building. Suitable places on the exterior of the buildings generally include front of a building, such as on the wall, door, letter-box pole, and like. The choice of place for mounting the address sign depends upon visibility from outside, such as a those desirous to locate the building could easily see the address sign.

The conventional address signs have one or more shortcomings, such as reduced visibility in the dark. A light bulb is known to be mounted near the address plaque to illuminate the address plaque in the evening and night, however, such illumination does not enhance the visibility of the alphanumeric characters representing the address significantly. The lack of good visibility of address poses a risk during distress and emergencies, wherein the emergency crew may not be able to locate the address quickly. For example, during a fire in a building, it will be desired that the firefighters could quickly locate the building, without any wastage of time in locating the correct address. According to a hypothesis, 25-30% of the calls, firefighters struggle to find the right address because house numbers cannot be seen especially at night. The emergency crews have always insisted to have properly marked addresses.

Delivery companies is another service area affected by improper addresses. A delivery person may waste a lot of time finding the desired address, thus making the job costlier, besides causing delays in deliveries and pickups. Thus, a need is appreciated for an improved address sign assembly with flash signaling and other integrated security features for home, apartments, offices and similar buildings.

SUMMARY OF THE INVENTION

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The principal objective of the present invention is therefore directed to an illuminated address sign assembly having improved visibility of an address, especially after dark.

It is another objective of the present invention that the illuminated address sign assembly also provides for emergency signaling.

It is further objective of the present invention that the illuminated address sign assembly also provides for signaling an opted-in delivery company.

It is still another objective of the present invention that the illuminated address sign assembly provides the enhanced readability of the address, especially after dark.

It is yet another objective of the present invention that the illuminated address sign assembly is economical to manufacture.

In one aspect, the present invention is directed to a novel illuminated address sign assembly comprising a frame having an open front side, an open rear side, a top, a bottom, a left, and a right side forming an enclosure. The open front side of the frame can be configured to interchangeably receive a first address plaque or a first opaque plaque. The open rear side of the frame can be configured to interchangeably receive a second address plaque or a second opaque plaque, wherein at least one of the open front side or the open rear side receives the address plaque. The address plaque includes an opaque indicia superimposed on a surface of a translucent backlit panel, the opaque indicia representing an address. In one case, the opaque indicia can be alphanumeric characters representing the address of the building. The opaque indicia can be configured to be highlighted against the illuminated translucent backlight panel; thus, the address is visible, especially in the dark. The address plaque under normal conditions can be illuminated by white light, resulting in an enhanced contrast for the opaque alphanumeric indicia. In one case, the color of the opaque indicia can be red, blue, or any other color, providing a good contrast against the white light illuminated translucent panel. The inner surface of the opaque plaque can be provided with a layer of reflective material.

In one aspect, the address plaque can be illuminated by a light source. The light source can be positioned inside the frame, for example, the light source can be mounted on the inner walls of the frame. The light source can be, in one case, light emitting diode (LED) lights configured to produce at least two colors. In one case, the LED could be red, green and blue (RGB) lights that can be configured to produce multiple colors. The light source is coupled to a control unit housed in the frame. The control unit can turn the light source on and off Moreover, the control unit can trigger the LED to produce a preprogrammed color. Also, the control unit can cause any specific color LED to flash for signaling. In one case, the address plaque can be illuminated by a white light, the emergency signaling can provide as a flashing red light and signaling for an opted-in delivery company be provided as a green light. The color can be dedicated to each service.

In one aspect, a light sensor can be coupled to the frame for detecting the intensity of external light, i.e. Sunlight. The light sensor can be coupled to the control unit for automatically controlling the illumination of the address plaque. The control unit, through the light sensor, can detect the onset of dusk and automatically turn the light source ON for illuminating the address plaque. Similarly, the onset of dawn can be detected by the light sensor, and upon detection of the dawn, the light sensor causes the LED lights to turn OFF.

In one aspect, the illuminated address sign assembly can further comprise a global positioning system (GPS) unit having an inbuilt GPS antenna. In a preferred embodiment, the GPS unit can have an accuracy of up to 1 meter. In a more preferred embodiment, the GPS unit can have an accuracy of up to 12 inches. The GPS unit can determine the geographic coordinates of the illuminated address sign assembly into which the GPS unit is configured. The position coordinates can be coupled with the address of the illuminated address sign assembly. The illuminated address sign assembly can update one or more navigation systems with the address and geographic coordinates of the address.

In one aspect, the illuminated address sign assembly can be powered by a portable battery housed in the frame. Preferably, the portable battery can be a rechargeable battery. More preferably, the portable battery can be a rechargeable lithium-ion battery. The portable rechargeable battery can last for about one year on a single charge. To further extend the battery life, the illuminated address sign assembly can further include a solar panel. The solar panel can be mounted on the top side of the frame. The top side of the frame can be sloped, such that the solar panel mounted on the top side of the frame can receive maximum sunlight. The solar panel can recharge the portable battery during the day, thus increasing the battery life.

In one aspect, the illuminated address sign assembly can further comprise a two-way camera mounted to the frame, preferably to the lower side of the frame. The camera can be coupled with motion sensors that could detect the presence of a person nearby the illuminated address sign assembly and inform the same to a concerned authority or user. Besides the camera, a speaker and microphone can also be configured in the illuminated address sign assembly, which may allow speaking to a visitor standing nearby the illuminated address sign assembly.

In one aspect, the control unit can include a network circuitry, such as Wi-Fi, BLUETOOTH®, and/or the Internet. The control unit can be configured in the frame for controlling different functions of the illuminated address sign assembly. For example, the control unit can be connected to the light sensor, light source, camera, mic, solar panel, and battery. The control unit permits remotely controlling the working and configuration of the illuminated address sign assembly. The illuminated address sign assembly can be wired or wirelessly coupled to a remote device for controlling one or more functions of the illuminated address sign assembly. For example, the illuminated address sign assembly can be coupled to a smartphone, laptop, tablet computer, and like through a BLUETOOTH® connection. The remote control can be coupled to the illuminated address sign assembly for controlling the one or more functions of the illuminated address sign assembly. For example, triggering the emergency signaling remotely from within the house.

In one aspect, the control unit can be further configured to receive details of a summoned first responder, i.e. a unique device id of a first responder. The same device id can be used to detect the entry of such first responder within a predetermined area of the illuminated address sign assembly. On detecting the entry of the first responder, within the predetermined area, the illuminated address sign assembly can trigger the red-light source to signal the approaching first responder. For example, the illuminated address sign assembly can detect the presence of a summoned ambulance, approaching the building and reaches within 0.25 miles from the illuminated address sign assembly. In response to the detection of the ambulance within the 0.25 miles range, the illuminated address sign assembly can trigger the emergency signaling i.e. flashing red light source. Like the first responder, the illuminated address sign assembly can be embodied with other service providers, such as an opted in delivery company.

In one aspect, the rear side of the frame can be configured with first attachment points for mounting the illuminated address sign assembly to a rigid surface, such as a wall or a door. The first attachment points can be hooks that can couple to a bracket, wherein the brackets have apertures to receive the hooks. The bracket can be mounted to the rigid surface. Furthermore, the illuminated address sign assembly can further include second attachment points for attaching suction cups. The suction cups can couple to a glass surface for mounting the illuminated address sign assembly to the glass surface.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

Although the specific features of the present invention are shown in some drawings and not in others. This is done for convenience only, as each feature may be combined with any or all the other features in accordance with the embodiments herein.

DETAILED DESCRIPTION

In the following detailed description, a reference is made to the accompanying drawings that form a part hereof, and in which the specific embodiments that may be practiced is shown by way of illustration. These embodiments are described in enough detail to enable those skilled in the art to practice the embodiments and it is to be understood that the logical, mechanical, and other changes may be made without departing from the scope of the embodiments. The following detailed description is therefore not to be taken in a limiting sense.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein includes all such modifications.

The word “exemplary” is used herein to mean “serving as an example, instance, or illustration.” Any embodiment described herein as “exemplary” is not necessarily to be construed as preferred or advantageous over other embodiments. Likewise, the term “embodiments of the present invention” does not require that all embodiments of the invention include the discussed feature, advantage or mode of operation.

The terminology used herein is for the purpose of describing embodiments only and is not intended to be limiting of embodiments of the invention. As used herein, the singular forms “a”, “an” and “the” are intended to include the plural forms as well, unless the context clearly indicates otherwise. It will be further understood that the terms “comprises,” “comprising,” “includes” and/or “including,” when used herein, specify the presence of stated features, integers, steps, operations, elements, and/or components, but do not preclude the presence or addition of one or more other features, integers, steps, operations, elements, components, and/or groups thereof.

Figure 1:
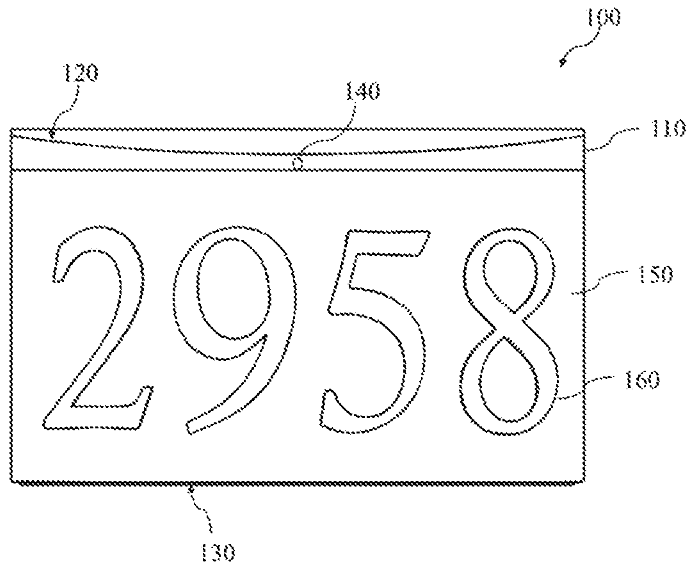
FIG. 1 is a front side of an illuminated address sign assembly, according to an embodiment of the present invention.
Figure 2:
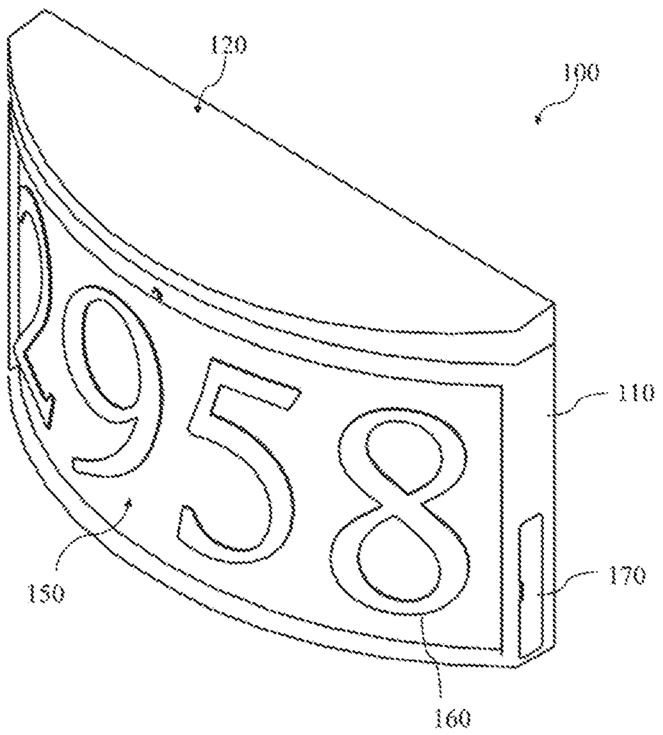
FIG. 2 is a perspective view of the illuminated address sign assembly of FIG. 1, according to an embodiment of the present invention.
Figure 3:
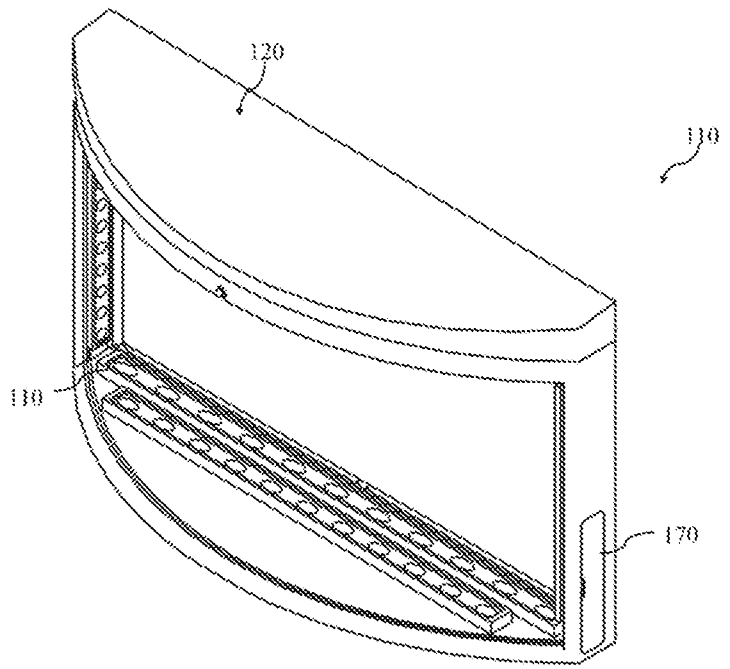
FIG. 3 is a perspective view of a frame of the illuminated address sign assembly, according to an embodiment of the present invention.
Figure 4:
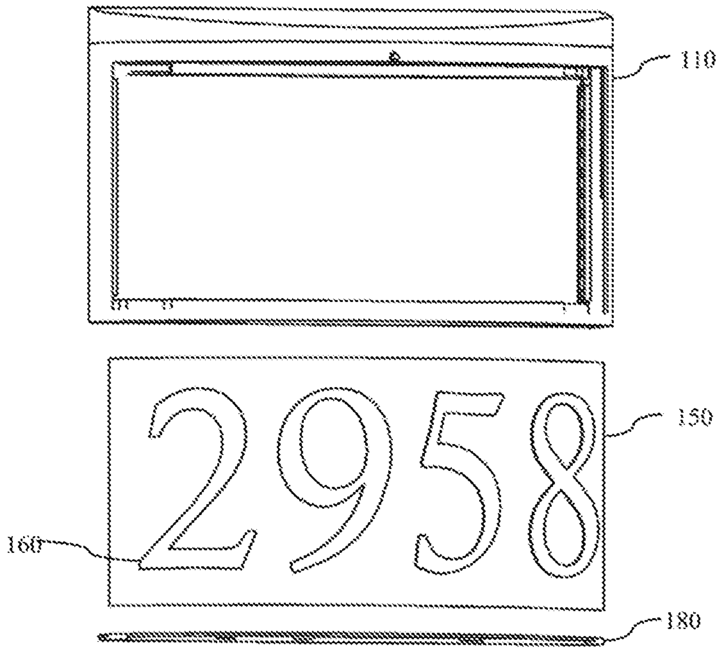
FIG. 4 is an exploded view of the illuminated address sign assembly of FIG. 1 showing the address plaque and the base bracket, according to an embodiment of the present invention.
Figure 5:
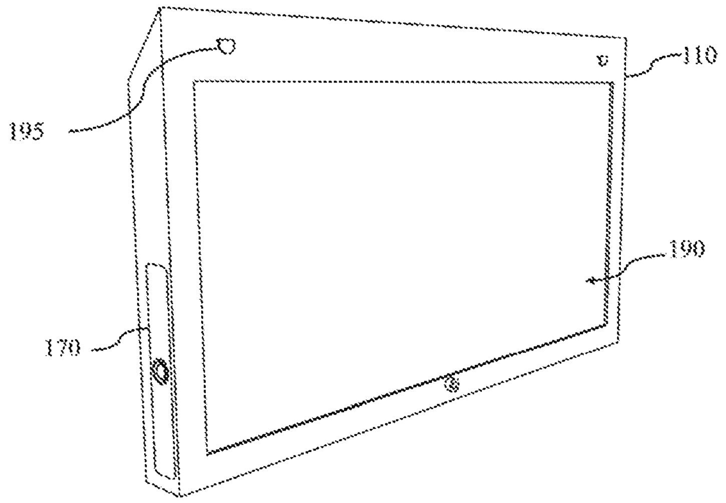
FIG. 5 is a rear side of the illuminated address sign assembly of FIG. 1, according to an embodiment of the present invention.
Figure 6:
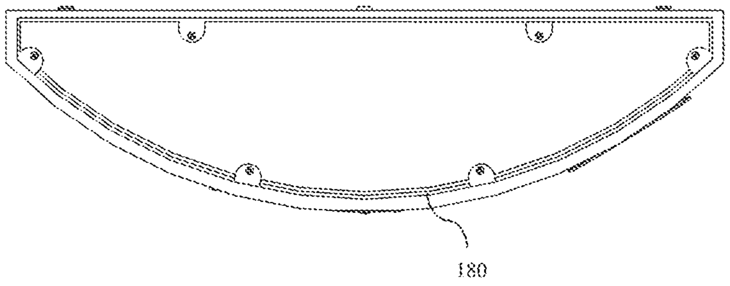
FIG. 6 is a bottom view of the illuminated address sign assembly of FIG. 1 showing the base bracket, according to an embodiment of the present invention.
Figure 7:
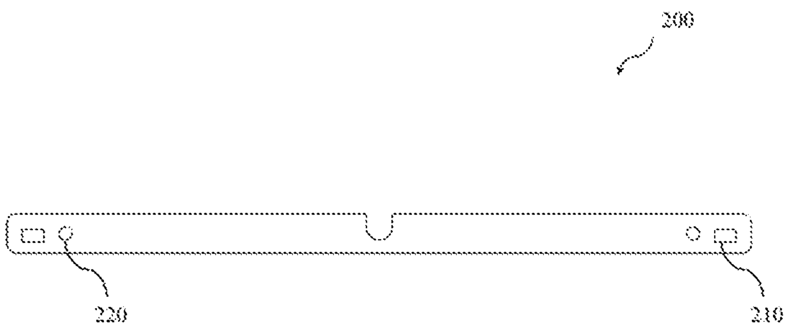
FIG. 7 shows a bracket for mounting the illuminated address sign assembly of FIG. 1, according to an embodiment of the present invention.

The present invention is directed to a novel illuminated address sign assembly. Now referring to FIG. 1 to 7 which shows an exemplary embodiment of the illuminated address sign assembly of the present invention. FIG. 1 is a front view of the illuminated address sign assembly 100 showing a frame 110, an address plaque 150, an opaque indicia 160, a light sensor 140 configured into the frame 110. The frame having the top side 120 and a bottom side 130. FIG. 2 is a perspective view showing the frame 110 and the address plaque 160. Further shown in FIG. 2 is a battery cover 170. FIG. 3 is a perspective view of the frame 110 showing the light source 110 and the battery cover 170. FIG. 4 is an exploded view showing the frame 110, address plaque 150, and the base bracket 180. FIG. 5 is the rear view of the illuminated address sign assembly showing the battery cover 160, an opaque plaque 190, and hooks 195. FIG. 6 shows the bottom of the illuminated address sign assembly showing a base bracket 180 used for securing the address plaque 150 and the opaque plaque 190 to the frame 110. FIG. 7 shows a bracket 200 used for mounting the illuminated address sign assembly to a rigid surface.

The illuminated address sign assembly is shown in FIG. 1-7 includes a frame having a front side, a rear side, top side, bottom side, left side, and right side forming an enclosure. The frame 110 shown in FIG. 3 is having a curve-shaped front side and a flat rear side. It is, however, to be noted that both the front side and the rear sides can be flat, or both the front side and the rear sides can be curved, or the front side can be flat, and the rear side can be curved. The front side and the rear side of the frame are configured to receive either an address plaque or an opaque plaque. Depending upon the shape of the frame, the curved side of the frame can receive a curved address plaque or a curved opaque plaque. Similarly, a flat side of the frame can receive a flat address plaque or a flat opaque plaque. In one case, the illuminated address sign assembly can be provided with both the curved and flat opaque plaques and address plaques. This can allow a user to interchange between different configurations. The address plaque mounted to the front side of the frame 110 is curved and is having an opaque alphanumeric indicia superimposed on the surface of a translucent backlit panel. The opaque indicia represent the address and may comprise numbers, symbols, and letters. The opaque indicia as shown in FIG. 1 can be of color such as red and blue, that have good contrast against the backlit panel, particularly white light illuminated back panel. Such a contrast of the opaque indicia against the back-lit panel provides enhances the visibility of the address to a person desirous to locate the building. The other side of the frame is flat and can receive a flat opaque plaque. The opaque plaque has an inner surface coated with a reflective material, such as to reflect the light towards the address plaque, thus increasing the intensity of illumination of the address plaque.

The address plaque can be illuminated by a light source, shown in FIG. 3. The light source can be an array of LED positioned inside the frame and coupled to the sides of the frame. The light source can be connected to a control unit housed inside the frame. The control unit can control the switching of the light source ON and OFF. Moreover, the control unit can regulate the intensity of the light source, for example, the control unit can be configured to switch the intensity of the light source between dim or normal. The current embodiment has been described to include LED, a skilled person will, however, appreciate that any other light source can be used, without departing from the scope of the present invention. Preferably, the LED can produce more than one color. More preferably, the LED can be an RGB LED that can produce multiple colors. While the white light source can be used to illuminate the address plaque, the other colors may serve different purposes. In one case, the red light can be used to signal any emergency or distress situation. The green light can be used to signal any non-emergency situation, for example, to signal an opted-in delivery company. Moreover, the white light source can be stable, but the other light sources can be configured to flash. For example, the red-light source can be configured to flash to send the emergency signal.

The illuminated address sign assembly can be illuminated during dark i.e. evening and night. While during daylight the illumination of the address plaque may not be needed. The light source can be turned ON and OFF remotely, for example, from inside of the building. The control unit can be configured with a network circuitry, such as BLUETOOTH®, Wi-Fi, Internet and like technologies known to a skilled person for wirelessly connecting electronic devices. The network circuitry of the control unit allows the illuminated address sign assembly to be remotely connected to a remote device, such as a remote control or a smartphone. An application can be provided for downloading to a smartphone for communicating with the illuminated address sign assembly of the present invention. Thus, the illuminated address sign assembly can be remotely controlled by a smartphone or remote control. In one case, the light source can be turned ON and OFF remotely, for example from inside of the building. A user in an emergency can remotely trigger the red flash from within the house. Similarly, the user can also remotely trigger the green flash for the opted-in delivery company. Also, the user can increase or decrease the intensity of the white light source remotely.

It is desirous to automate the task of turning the white light source ON during the onset of dark and turn the white light source OFF at the onset of the dawn. Keeping the light source always ON can result in wastage of electricity, decreased battery life, and shortening of the life of the light source. Thus, it is desired to provide a light sensor coupled to the control unit of the illuminated address sign assembly. The light sensor can be mounted anywhere in the frame, FIG. 1-7 show the light sensor mounted in the middle of the top side of the frame. The light sensor can detect the intensity of Sunlight and based on the intensity of the Sunlight could control the turning the light source ON and OFF.

In one embodiment, the illuminated address sign assembly includes a global positioning unit. The global positioning unit includes a GPS antenna having an accuracy of 1 meter, and more preferably, having an accuracy of 12 inches. The global positioning unit can be electronically coupled to the control unit of the illuminated address sign assembly. After, installation of the illuminated address sign assembly, the GPS unit can determine the exact geographic coordinates of the illuminated address sign assembly. The control unit upon receiving the geographic coordinates from the GPS unit can couple the address to the GPS coordinates. Thereafter, the control unit can update the address with its position coordinates to one or more navigation systems, for example, Google Maps. Thus, those desirous to reach the address, can look in the Google maps to navigate to the exact location. The present invention simplifies the procedure for updating the navigation system with the correct position coordinates. In case of any change in the address, the control unit can be configured with the new address, and the control unit can automatically update the new geographic coordinates with the associated address to the navigation systems.

The illuminated address sign assembly can further comprise a solar panel mounted on the top side of the frame. The solar panel can be provided to recharge the battery, thus extending the battery life. The top side of the frame can be sloped as shown in FIG. 4, such that the solar panel mounted on the top side could receive maximum sunlight.

The illuminated address sign assembly can be mounted to a rigid surface, such as a wall, door, window, postbox pole, and like. The location of the illuminated address sign assembly can be such that a passerby could easily see and read the address depicted on the illuminated address sign assembly. To mount the illuminated address sign assembly to the rigid surface, the illuminated address sign assembly can be provided with a bracket shown in FIG. 7. The bracket can have rectangular apertures 210 to receive the hooks configured on the rear side of the frame. The bracket 200 further includes round apertures 220 for coupling the bracket to the rigid surface. A pair of fasteners, such as self-tapping screws can be used to mount the bracket to the rigid surface. Thereafter, the illuminated address sign assembly can be mounted by hooking the illuminated address sign assembly into the apertures 210.

The address plaque and the opaque plaque have a coupling mechanism for fitting into the frame, wherein the frame also has the corresponding coupling mechanism. For example, the address plaque and the opaque plaque can have flanges on their side which slides into the frame through the bottom. Alternatively, the address plaque and the opaque plaque can snap-fit into the front and rear sides of the frame. The address plaque and the opaque plaque can thereafter be secured through a base bracket coupled to the bottom side of the frame. The base bracket in FIG. 6 is shown to be coupled through screws, however, a skilled person will understand that any other type of fastening mechanism, such as snap fit can be embodied without departing from the scope of the present invention.

Figure 8:
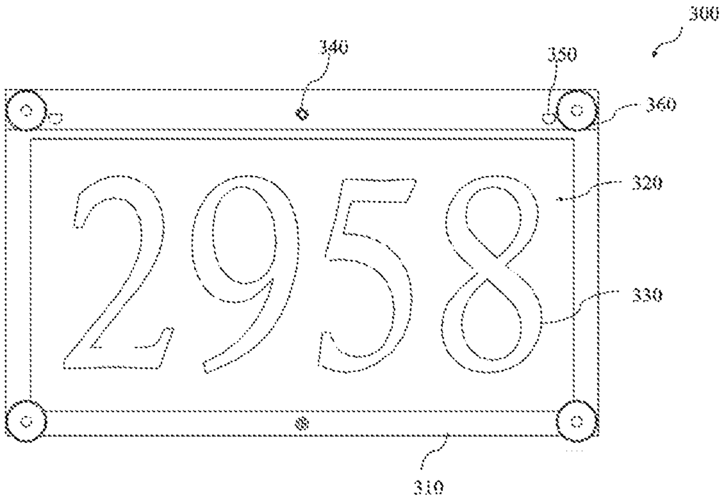
FIG. 8 is the rear side of an illuminated address sign assembly showing the suction cups, according to another embodiment of the present invention.
Figure 9:
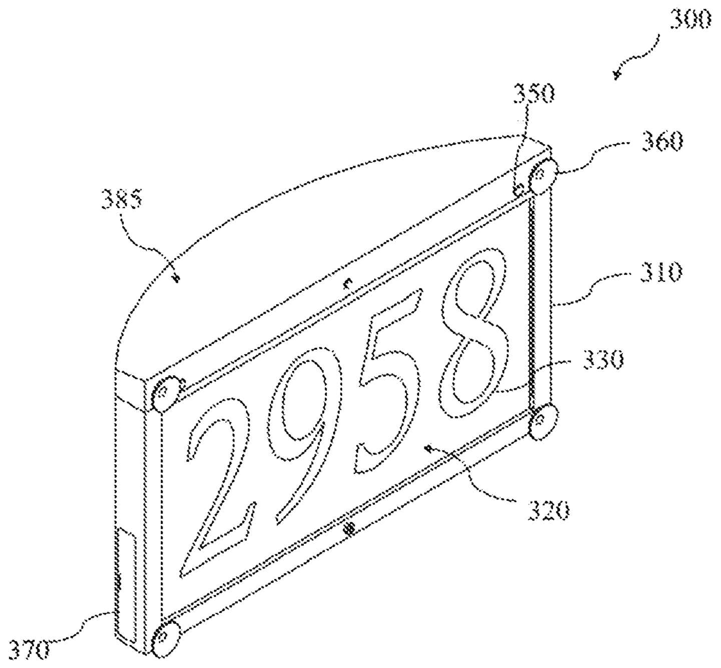
FIG. 9 is a perspective view of the illuminated address sign assembly of FIG. 8, according to an embodiment of the present invention.
Figure 10:
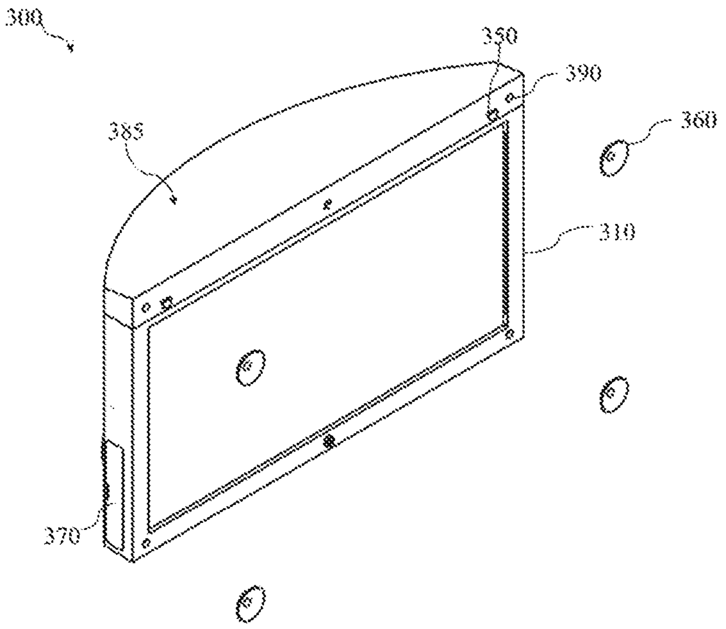
FIG. 10 is an exploded view of the illuminated address sign assembly of FIG. 9, according to an embodiment of the present invention.
Figure 11:
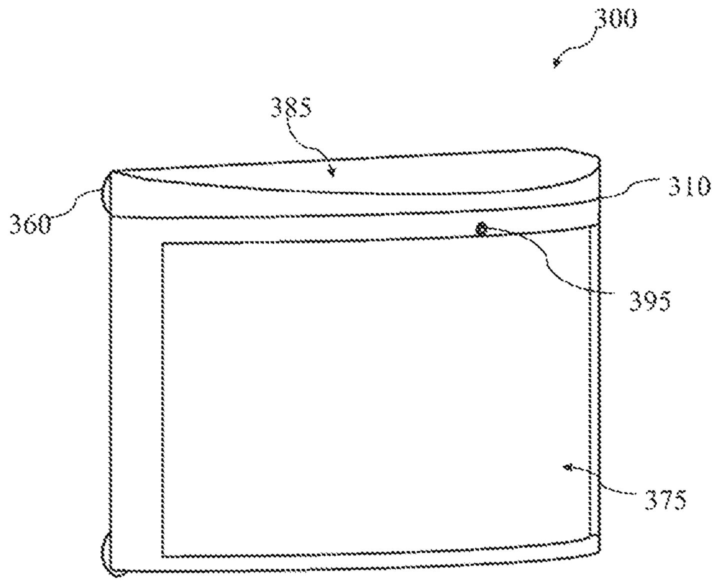
FIG. 11 is a front perspective view of the illuminated address sign assembly of FIG. 9, according to an embodiment of the present invention.
Figure 12:
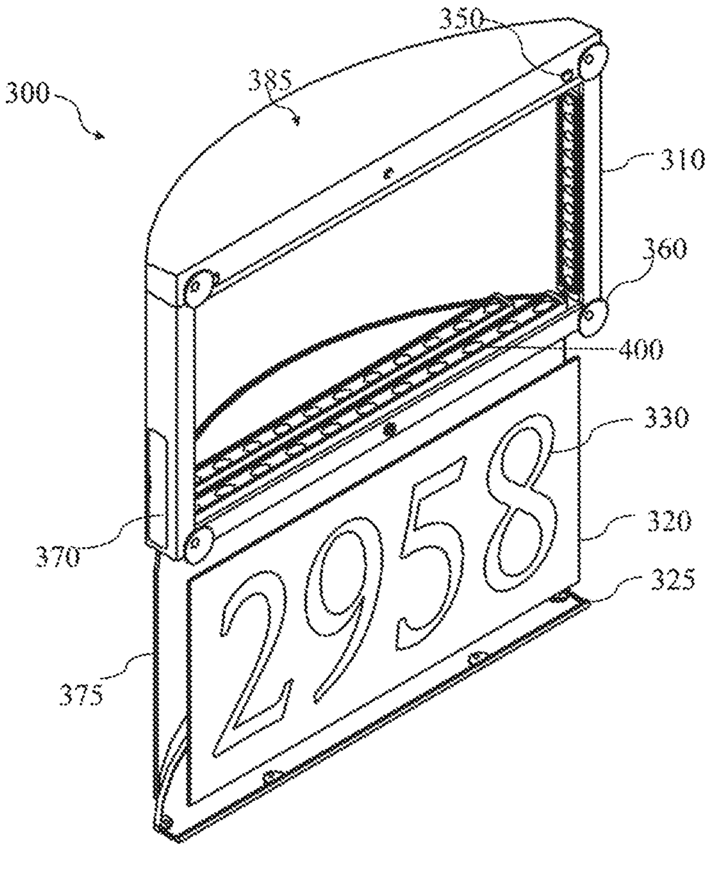
FIG. 12 is an exploded view of the illuminated address sign assembly of FIG. 9, according to an embodiment of the present invention.
Figure 13:
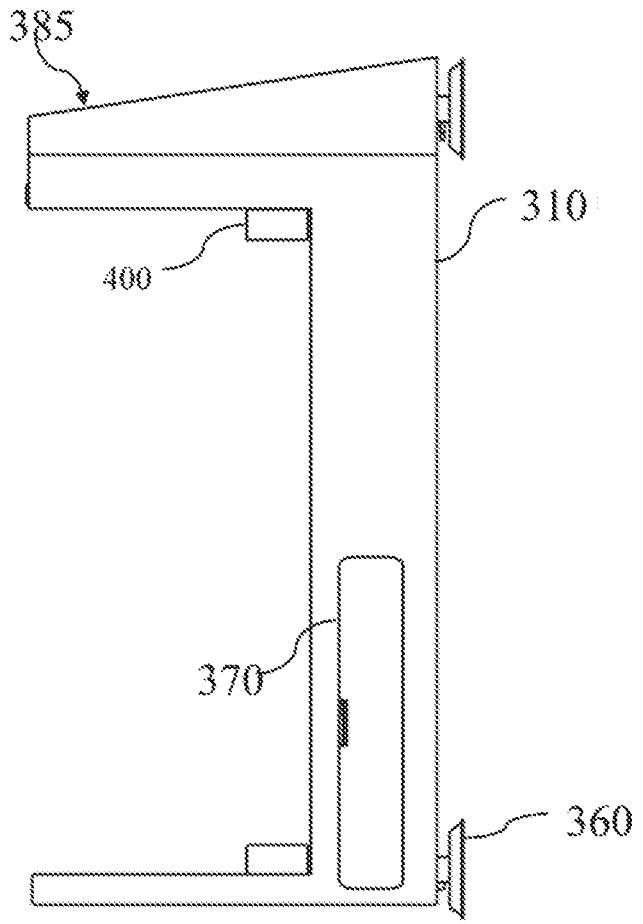
FIG. 13 is a side view of the illuminated address sign assembly of FIG. 9, according to an embodiment of the present invention.

FIG. 8 to 13 shows an alternate embodiment of the present invention. FIG. 8 shows a rear side of the illuminated address sign assembly, which is of a flat shape, as can be seen in FIG. 9 which is a rear perspective view of the illuminated address sign assembly 300. It can be seen in FIG. 9 that the rear side of the frame 310 can have a flat address plaque 320. The front side of the frame 310 is curved. An opaque indicia 330 can be superimposed on the translucent backlit panel. A light sensor 340 configured near the top-middle portion of the rear side of the frame. A pair of hooks 350 can be configured on the rear side of the frame 310. Four suction cups 360 can be seen coupled to four corners of the rear side of the frame 310. FIG. 10 shows an exploded view of the illuminated address sign assembly 300 showing the attachment points 390. The attachment points 390 can be coupled with the suction cups 360. The attachment points 390 allows the suction cups 360 to be removably coupled. For example, the suction cups 360 can be mounted to the attachment point 390 through a fastener, such as screws. FIG. 11 shows the front side of the illuminated address sign assembly 300 having a curved opaque plaque 375 coupled to the front side of the frame 310. The front side of the frame can also be provided with a light sensor 395. Light sensors can be provided on both sides of the frame, such as the user can easily interchange the two sides of the illuminated address sign assembly. For example, the address plaque can be applied to the front side only or both the front side and the rear sides can have the address plaque. FIG. 12 is an exploded view showing the frame 310, the top side of the frame 385, a pair of hooks 350 configured on the rear side of the frame 310, and a battery cover 370. Further can be seen in FIG. 12 is the address plaque 320 coupled on the rear side of the frame 310, the opaque plaque 375 coupled with the front side of the frame 310, a base bracket 325 coupled to the bottom side of the frame 310 for securing the address plaque and the opaque plaque 375.

The illuminated address sign assembly according to the present invention is of an advantage providing an option to use the illuminated address sign assembly in different combinations. Either the front side or the rear side of the frame can receive the address plaque, and in addition both the front side and the rear side of the frame can receive the address plaque. However, because the front side of the frame can preferably of a curved shape. The front curved side of the frame can receive only a curved address plaque, while the flat rear side can receive a flat address plaque. Similarly, the front curved side of the frame can receive a curved opaque plaque, while the flat rear side can receive a flat opaque plaque. The illuminated address sign assembly can be provided with both the curved and flat address plaques and opaque plaques. Thus, the user can simply configure the illuminated address sign assembly with different options, such as both sides can have the address plaque. FIG. 8-13 shows one such embodiment, wherein the front side of the frame can have a curved opaque plaque, while the flat address plaque can be coupled to the rear side of the frame. Furthermore, the rear side of the frame can be provided with suction cups that can allow mounting the illuminated address sign assembly to a glass surface. Suitable attachment points can be provided along with the hooks on the rear side of the illuminated address sign assembly. These attachment points can be used to couple the suction cups. This embodiment of the present invention allows the illuminated address sign assembly to be mounted from inside of the glass window, glass door, or a glass wall through the suction cups. It may be desired to mount the illuminated address sign assembly from inside the glass window. Here the user can simply replace the opaque plaque from the rear side of the frame with the address plaque and couple the four suction cups. Thereafter, the unit can be mounted to the glass pane through the suction cups. Moreover, the front side of the illuminated address sign assembly can also be provided with the address plaque, thus the address can be visible on both sides.

Figure 14:
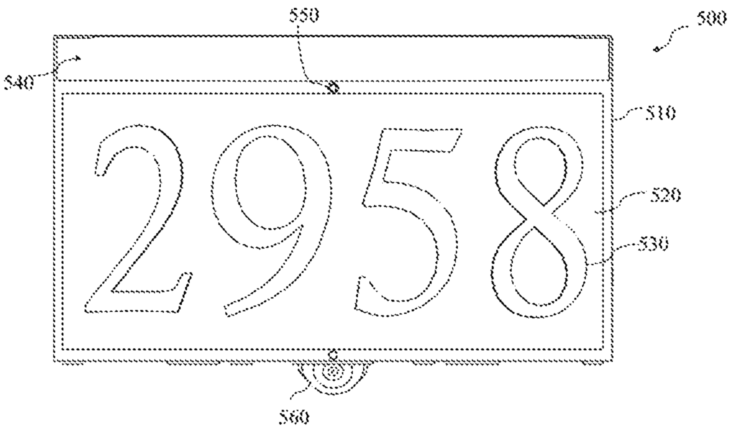
FIG. 14 shows the illuminated address sign assembly mounted to a letter-box pole, according to an embodiment of the present invention.
Figure 15:
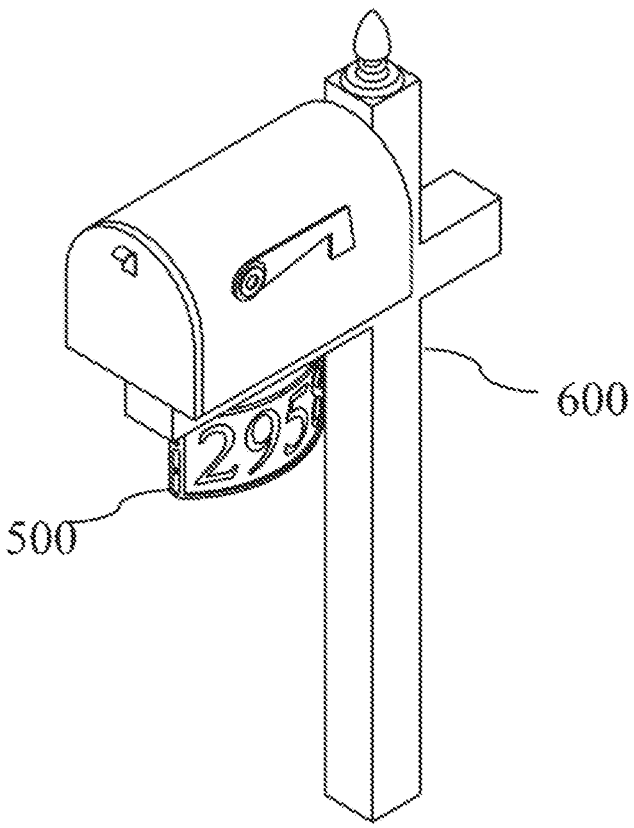
FIG. 15 is a front face of the illuminated address sign assembly having a camera, according to an embodiment of the present invention.

FIG. 14 show another embodiment of the present invention, wherein the illuminated address sign assembly 500 can be provided with additional security features. Particularly, FIG. 14 shows a camera 560 mounted to the bottom side of the frame 510. FIG. 14 shows the front side of the illuminated address sign assembly 500 having the address plaque 520. The address plaque 520 having an opaque indicia 530 representing the address. FIG. 15 shows the illuminated address sign assembly of FIG. 14 mounted to letter-box pole 600. The illuminated address sign assembly 500 mounted to the letter-box pole 600 can be provided with an address plaque on both sides i.e. both the front side and the rear side of the frame.

The camera can be preferably a two-way camera mounted on the bottom side of the frame with additional motion-sensing functionality. The camera provides an additional security feature to the illuminated address sign assembly. The camera can be coupled to the control unit of the illuminated address sign assembly and configured to detect any motion within the field of the camera. The output from the camera can be transmitted to a remote device through the control unit. The output of the camera can also be recorded to a device wire or wirelessly coupled to the control unit. For example, the control unit can be coupled to a remote device through a Wi-Fi network for recording the output of the camera. The camera can be further controlled remotely through a remote device, such as an intercom unit installed in the house or a smartphone. The illuminated address sign assembly can also be provided with a microphone and a speaker, such as to provide an intercom facility, wherein a visitor can be interviewed through the illuminated address sign assembly. Furthermore, the illuminated address sign assembly can detect any unwanted presence of a person nearby the illuminated address sign assembly, and accordingly triggers an alarm to a concerned person. The illuminated address sign assembly can be further provided with a solar panel for powering the control unit and the camera. Preferably, the solar panel can be mounted on the top side of the illuminated address sign assembly.

Figure 16:
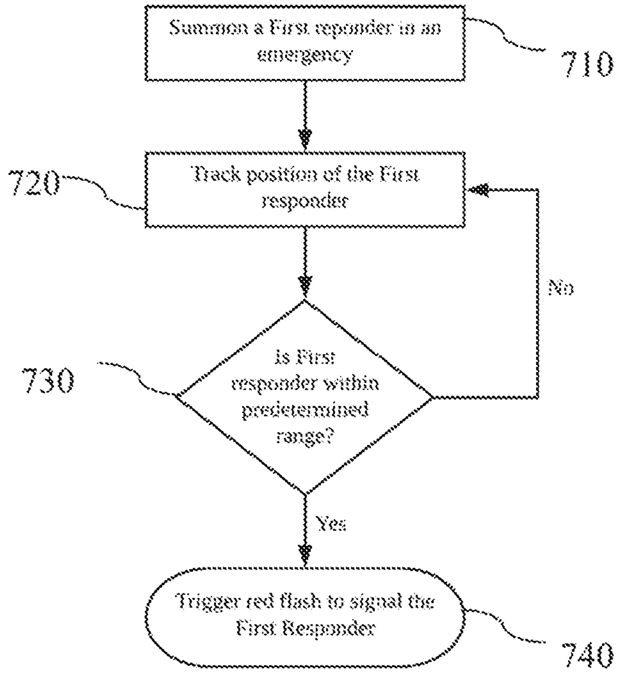
FIG. 16 is a flow chart showing a method of signaling a first responder, according to an embodiment of the present invention.

FIG. 16 shows an embodiment of the present invention. The illuminated address sign assembly can be used to signal a service provider heading to the building. The service provider can be a first responder in an emergency, ambulance, firefighters, an opted-in delivery company, and like. Signaling the service provider can reduce the time of the service provider in finding the desired address. Thus, any wastage of time in locating the correct address can be checked, which is particularly desired in an emergency. FIG. 16 shows a method for signaling a first responder who was summoned for an emergency. The first responder can be summoned about the emergency at step 710. In response, the emergency service provider can share a unique ID or a tag, which allows tracking the position of the first responder. At step 720, the illuminated address sign assembly can track the position of the first responder. At step 730, the illuminated address sign assembly can determine if the first responder is within the predetermined range, for example within 0.25 miles from the illuminated address sign assembly. In case the first responder can be located within the predetermined range, the illuminated address sign assembly can trigger the red LED flashing to signal the first responder.

Figure 17:
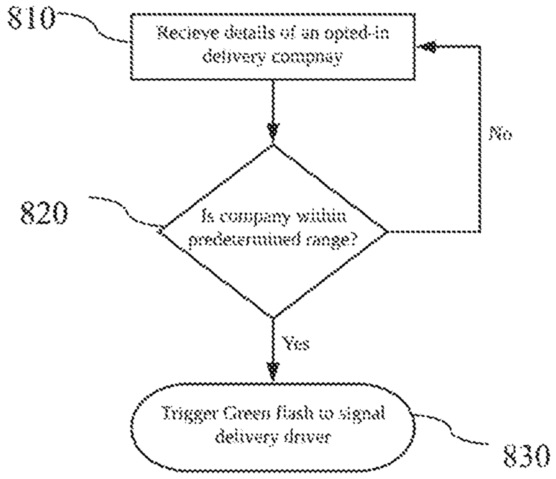
FIG. 17 is a flow chart showing a method of signaling an opted-in delivery company, according to an embodiment of the present invention.

FIG. 17 shows another embodiment of the present invention for signaling an opted-in delivery company. A delivery company that associates with the illumination address sign assembly has been referred herein as an opted-in delivery company. At step 810, details of the opted-in delivery system can be determined. Thereafter, at step 820 it can be determined if the opted-in delivery company has arrived within the predetermined range. Upon the arrival of the opted-in delivery company within the predetermined range, the illumination address sign assembly can trigger a flashing of a predetermined light source. For example, the Green light source can be flashed to signal the delivery vehicle.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An illuminated address sign comprising:

a frame including an open front side and an open rear side, wherein the open front side is configured to interchangeably receive a first plaque, and the open rear side is configured to interchangeably receive a second plaque;

a plurality of first attachment points configured on the open rear side of the frame, the plurality of first attachment points configured to couple with a bracket for mounting the illuminated address sign to a first surface;

a control unit coupled to the frame and a light source;

a light sensor coupled to the frame and the control unit; and a global positioning system (GPS) unit coupled to the control unit and determines geographic coordinates of the illuminated address sign, wherein one of the first plaque and the second plaque is an address plaque and the other is an opaque plaque, wherein the control unit is configured to:

receive the geographic coordinates of the illuminated address sign from the GPS unit;

couple the geographic coordinates with an address; and update one or more navigation systems with the address and the geographic coordinates.

2. The illuminated address sign of claim 1, wherein one of the open front side receives the first plaque or the open rear side receives the second plaque, each of the first plaque and the second plaque comprises an opaque indicia superimposed on a surface of a translucent backlit panel, and the opaque indicia representing an address.

3. The illuminated address sign of claim 1, wherein the plurality of first attachment points is configured to couple to a plurality of suction cups for mounting the illuminated address sign to the first surface.

4. The illuminated address sign of claim 1, wherein the first plaque is curve-shaped, and the second plaque comprises an inner layer of reflective material.

5. The illuminated address sign of claim 1, wherein the light source illuminates in at least two different colors.

6. The illuminated address sign of claim 1, wherein the light source comprises at least one light emitting diode (LED).

7. The illuminated address sign of claim 1, wherein the control unit wirelessly connects to one or more remote devices, and the one or more remote devices is selected from a group consisting of a smartphone, a remote control, a tablet computer, a desktop, and a laptop.

8. The illuminated address sign of claim 1, wherein the control unit is configured to:

receive details of a service provider;

determine arrival of the service provider within a predetermined range from the illuminated address sign; and trigger flashing of the light source for signaling the service provider upon the arrival of the service provider within the predetermined range from the illuminated address sign.

9. The illuminated address sign of claim 1, wherein the control unit is configured to:

receive details of an opted-in delivery company;

determine arrival of the opted-in delivery company within a predetermined range; and trigger flashing of at least a portion of the light source for signaling a delivery driver.

10. The illuminated address sign of claim 9, wherein the at least a portion of the light source comprises a color specific to the opted-in delivery company.

11. The illuminated address sign of claim 1, further comprising a camera mounted to the frame and coupled to the control unit, a microphone and a speaker.

12. The illuminated address sign of claim 1, further comprising:

a plurality of second attachment points configured on the open rear side of the frame, the plurality of second attachment points configured for mounting the illuminated address sign to a second surface.

13. The illuminated address sign of claim 12, wherein the second surface is a glass panel.

14. The illuminated address sign of claim 1, wherein the light sensor is configured to detect intensity of light outside of the illuminated address sign.

15. An illuminated address sign comprising:

a frame including an open front side and an open rear side, wherein the open front side is configured to interchangeably receive a first plaque, and the open rear side is configured to interchangeably receive a second plaque;

a plurality of first attachment points configured on the open rear side of the frame, the plurality of first attachment points configured to couple with a bracket for mounting the illuminated address sign to a first surface;

a control unit coupled to the frame and a light source; and a global positioning system (GPS) unit coupled to the control unit, the GPS unit determines geographic coordinates of the illuminated address sign, wherein the control unit is configured to:

receive the geographic coordinates of the illuminated address sign from the GPS unit;

couple the geographic coordinates with an address; and update one or more navigation systems with the address and the geographic coordinates.

16. The illuminated address sign of claim 15, wherein the frame further comprises:

a light sensor coupled to the frame and to the control unit.

17. The illuminated address sign of claim 16, wherein:

one of the open front side receives the first plaque or the open rear side receives the second plaque;

each of the first plaque and the second plaque comprises an opaque indicia superimposed on a surface of a translucent backlit panel;

the opaque indicia representing an address;

the plurality of first attachment points is configured to couple to a plurality of suction cups for mounting the illuminated address sign to the first surface; and the light sensor is configured to detect intensity of light outside of the illuminated address sign.

18. The illuminated address sign of claim 15, wherein the first plaque is one of an address plaque or an opaque plaque.

19. The illuminated address sign of claim 15, wherein the second plaque is one of an address plaque or an opaque plaque.

20. The illuminated address sign of claim 15, wherein:

the control unit wirelessly connects to one or more remote devices; and the one or more remote devices is selected from a group consisting of a smartphone, a remote control, a tablet computer, a desktop, and a laptop.

21. The illuminated address sign of claim 15, wherein:

the control unit is configured to:

receive details of a service provider;

determine arrival of the service provider within a predetermined range from the illuminated address sign; and trigger flashing of the light source for signaling the service provider upon the arrival of the service provider within the predetermined range from the illuminated address sign.

22. The illuminated address sign of claim 15, further comprising a camera mounted to the frame and coupled to the control unit, a microphone and a speaker.

23. The illuminated address sign of claim 15, further comprising:

a plurality of second attachment points configured on the open rear side of the frame, the plurality of second attachment points configured for mounting the illuminated address sign to a second surface.

24. The illuminated address sign of claim 23, wherein the second surface is a glass panel.

25. An illuminated address sign comprising:

a frame including an open front side and an open rear side, wherein the open front side is configured to interchangeably receives a first plaque, and the open rear side is configured to interchangeably receive a second plaque;

a plurality of first attachment points configured on the open rear side of the frame, the plurality of first attachment points configured to couple with a bracket for mounting the illuminated address sign to a first surface;

a control unit coupled to the frame and a light source; and a light sensor coupled to the frame and the control unit, wherein one of the first plaque and the second plaque is an address plaque and the other is an opaque plaque, wherein the control unit is configured to:

receive details of a service provider;

determine arrival of the service provider within a predetermined range from the illuminated address sign; and trigger flashing of the light source for signaling the service provider upon the arrival of the service provider within the predetermined range from the illuminated address sign.

* * * * *